J. S. DUNCAN.
TYPE SETTING AND DISTRIBUTING MACHINE.
APPLICATION FILED OCT. 5, 1908.
963,692.
Patented July 5, 1910.
10 SHEETS—SHEET 8.
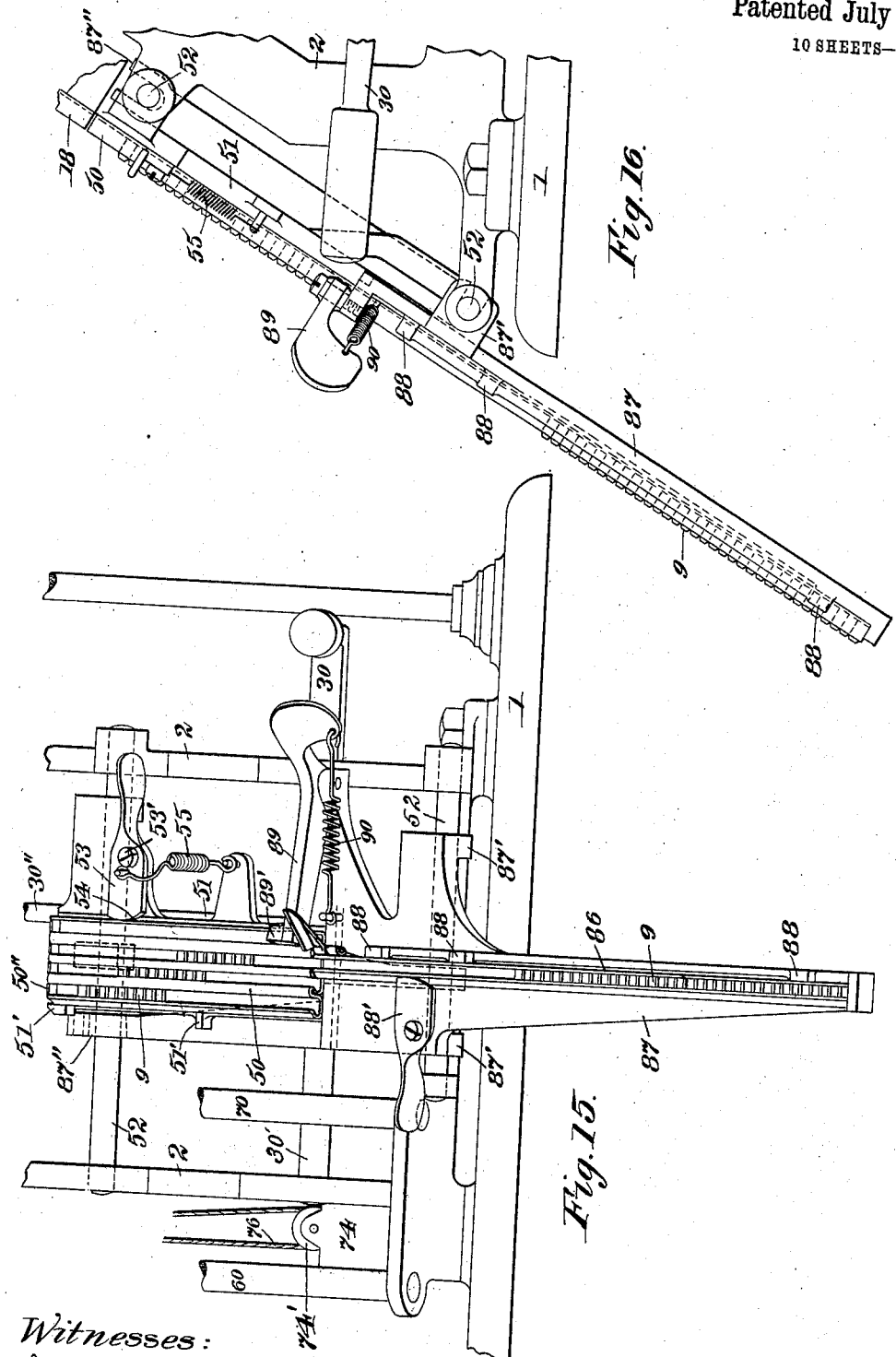
Witnesses:
George Haynes
M. A. Kiddie
Inventor
Joseph S. Duncan
By
Attorney.

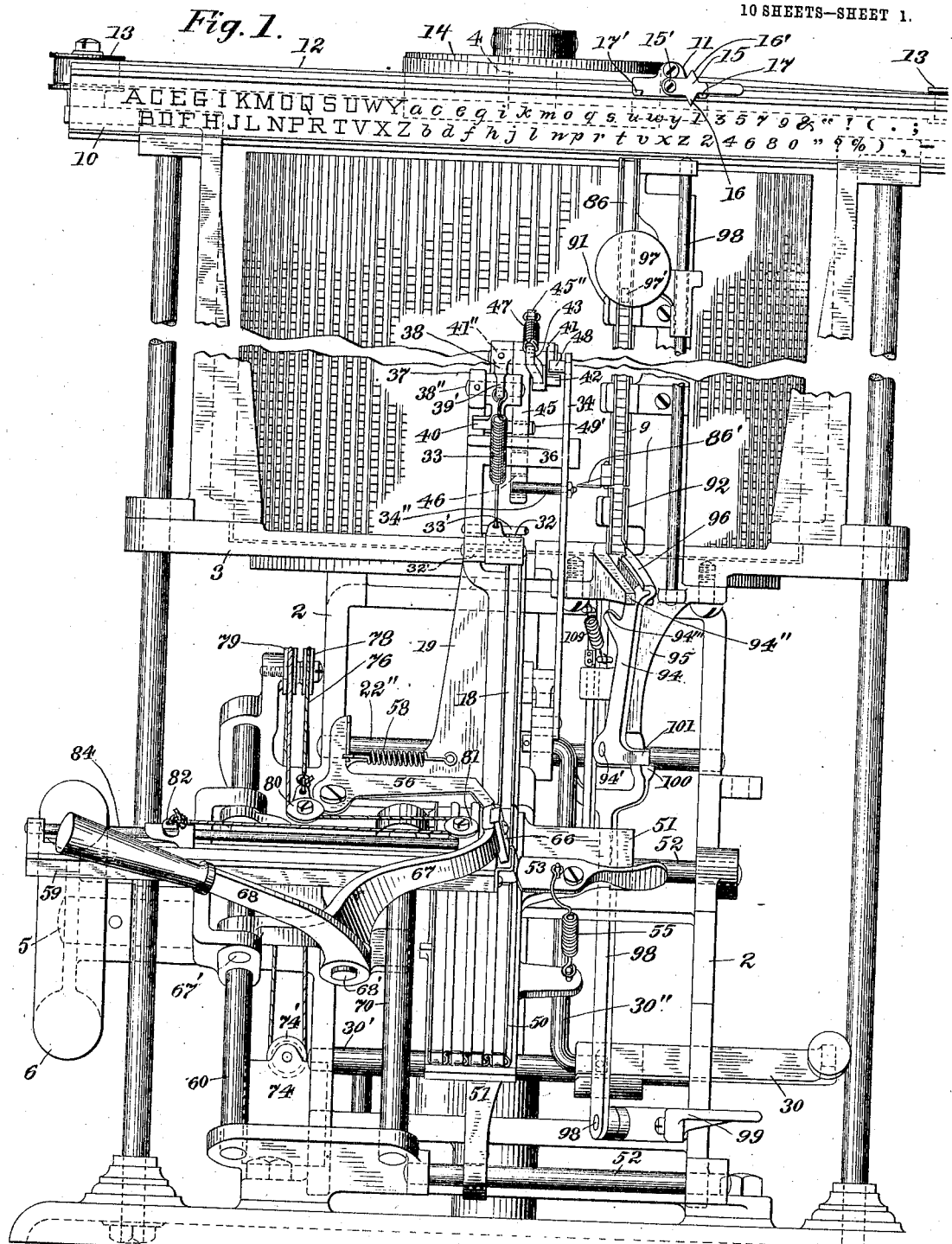

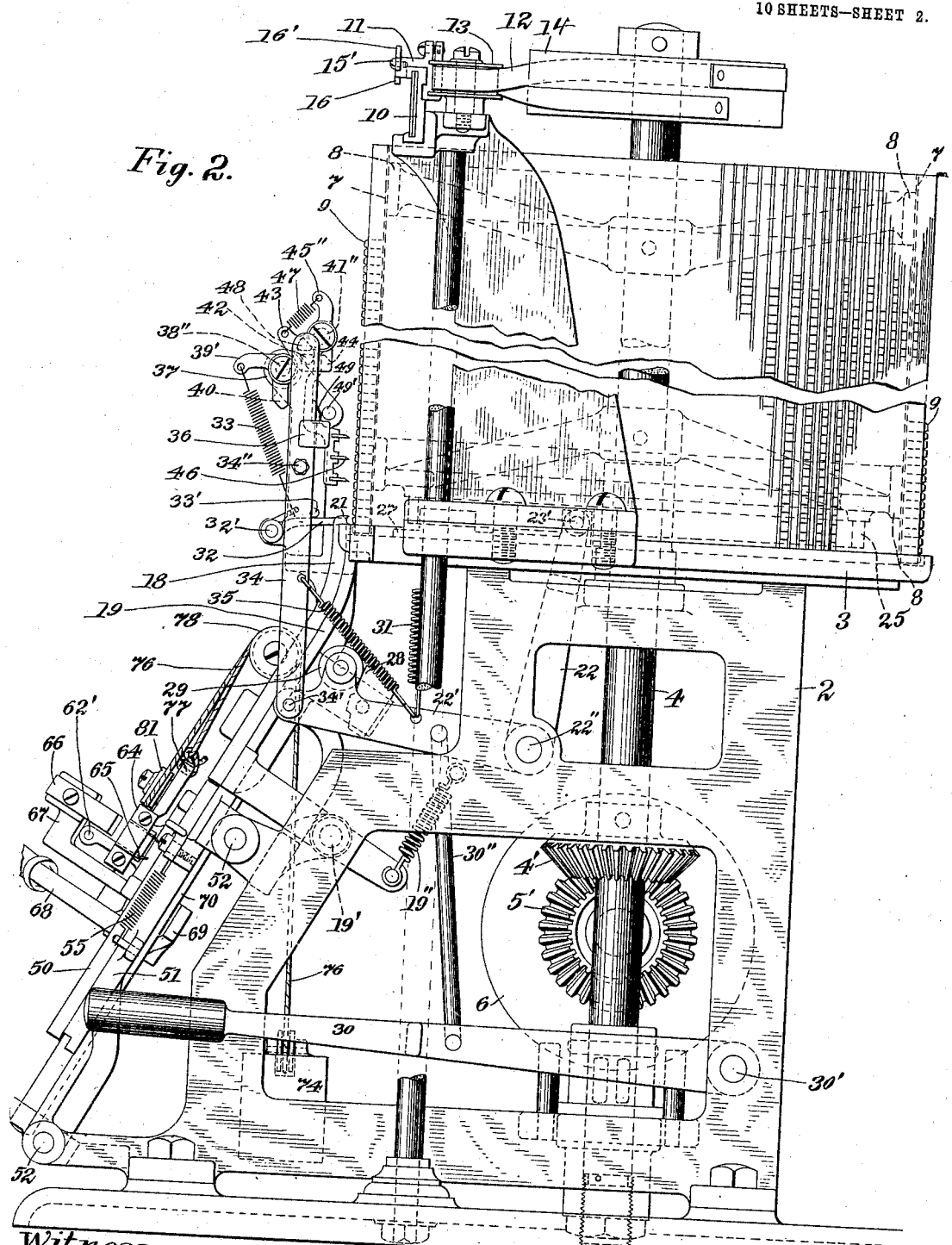

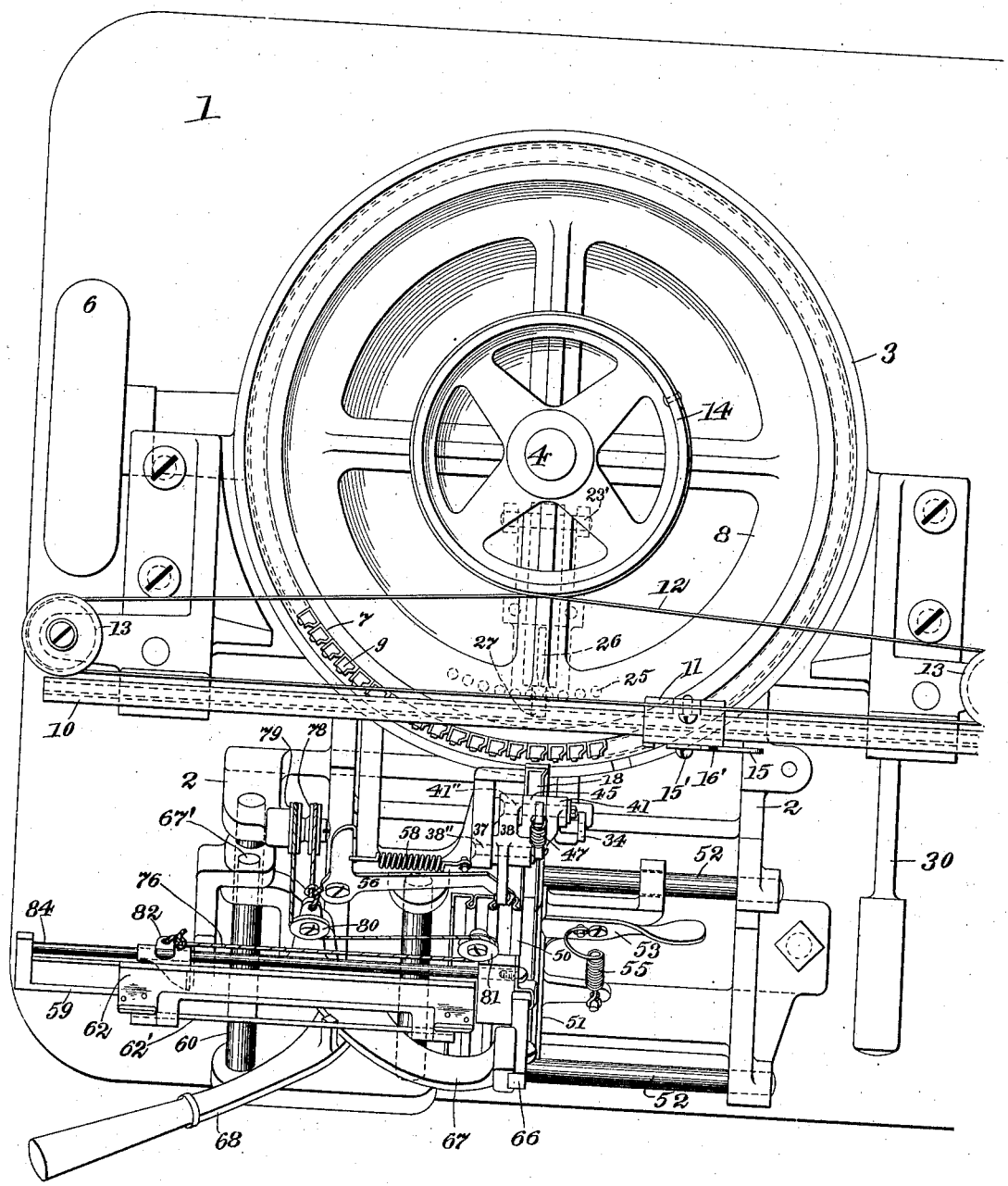

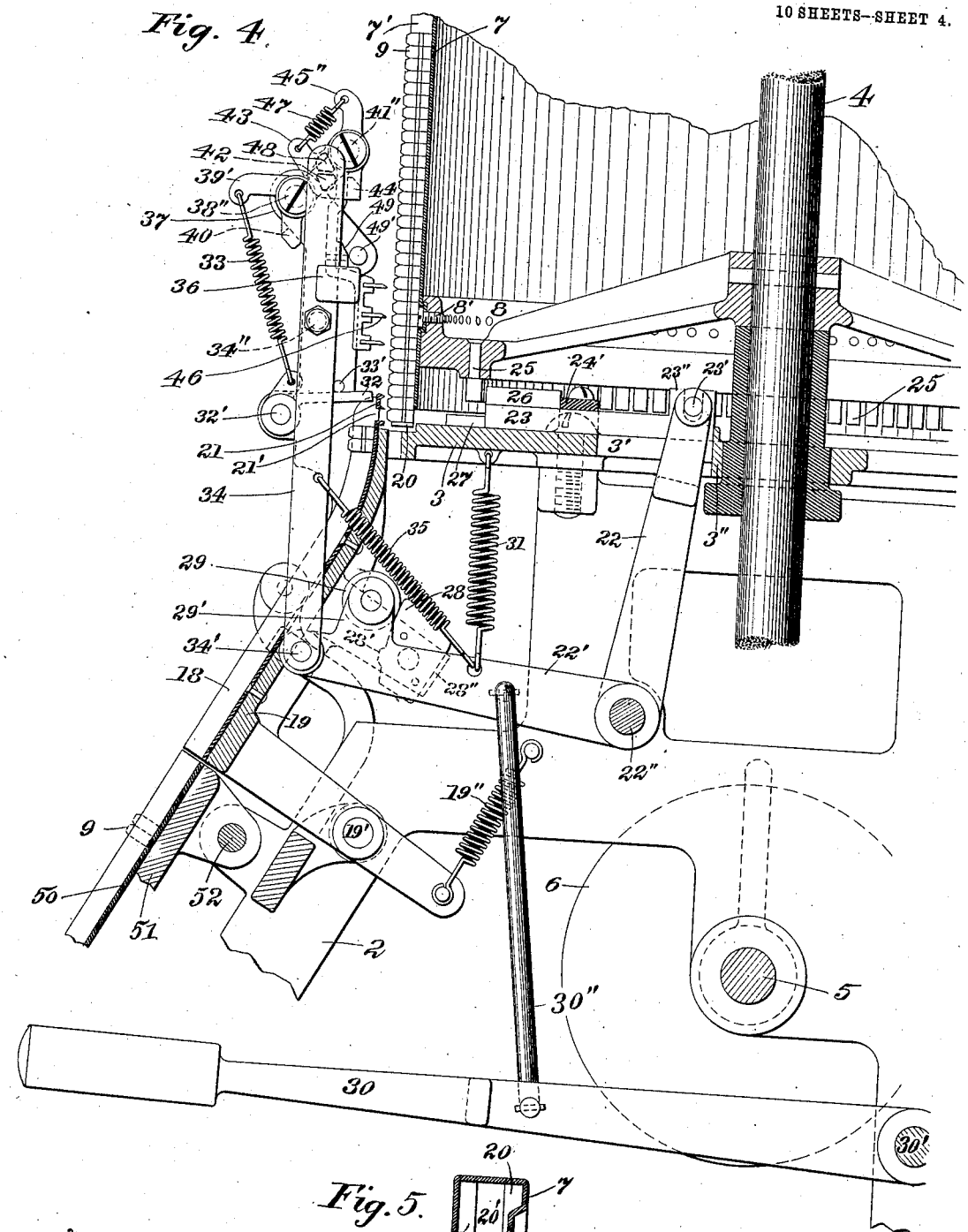

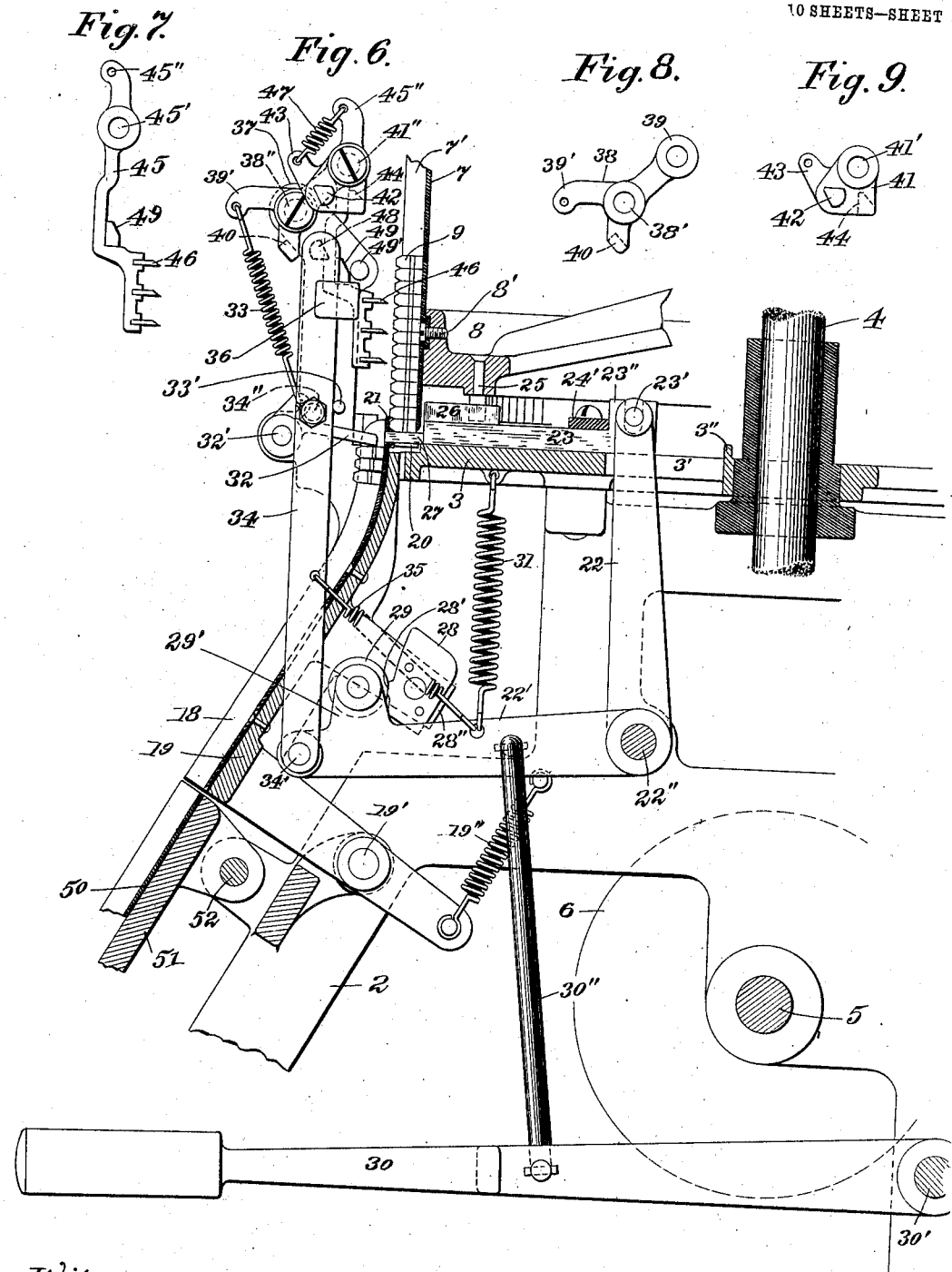

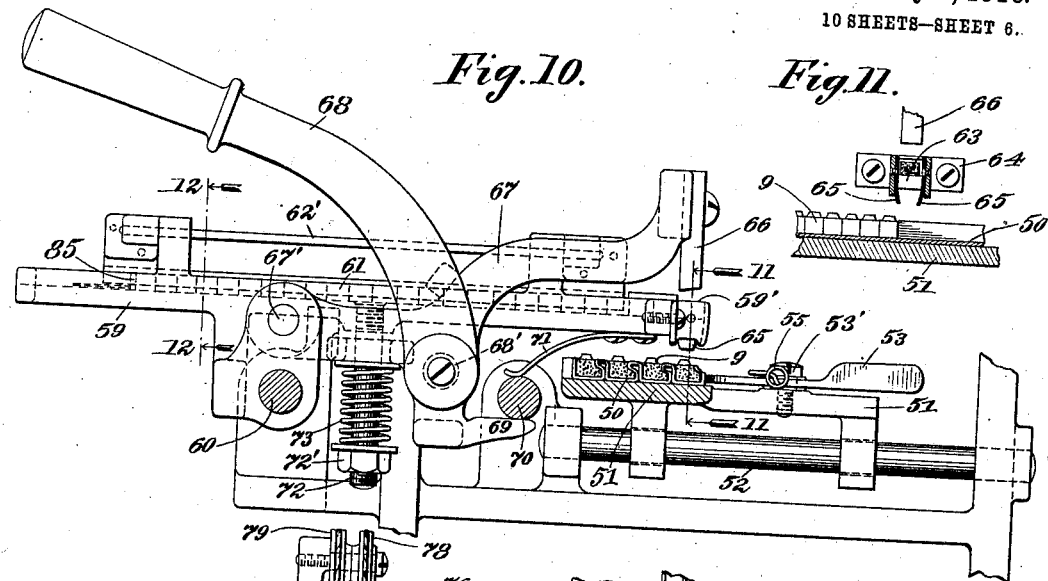
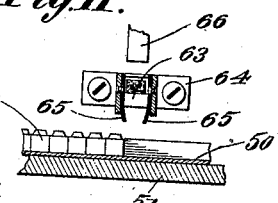
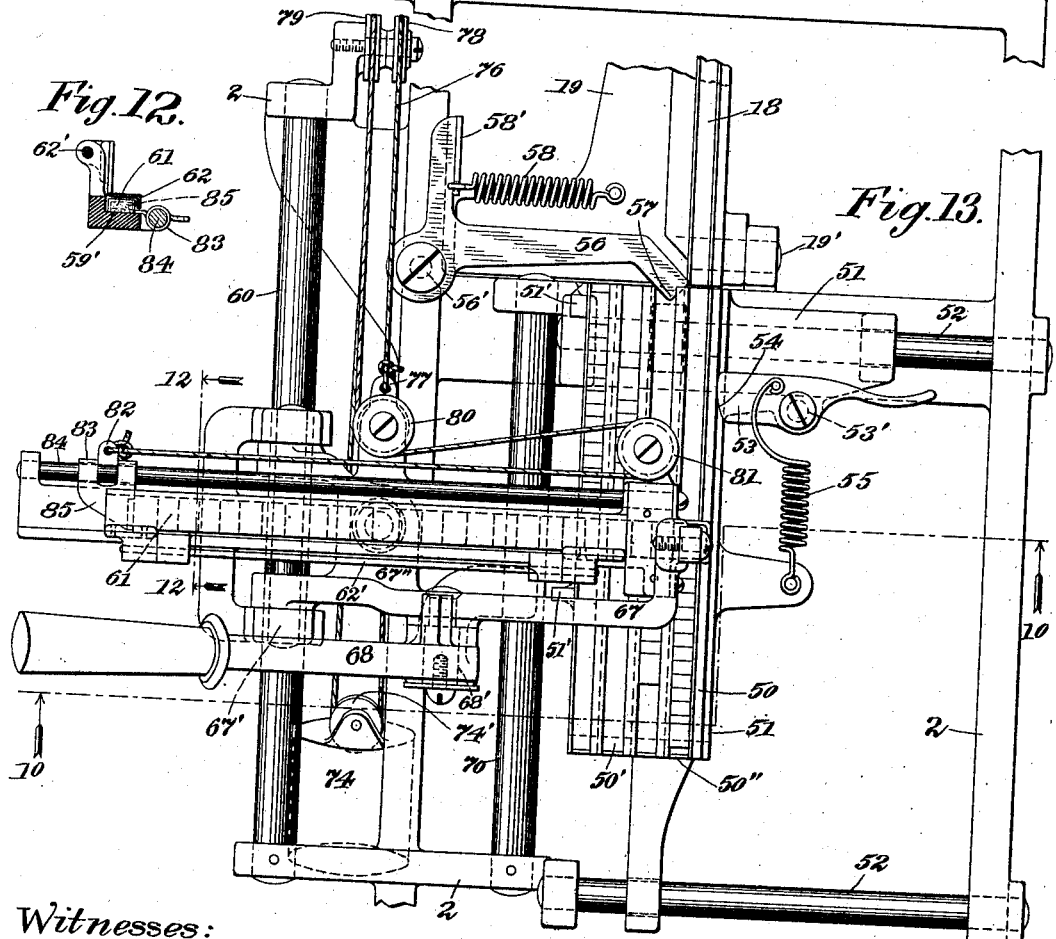
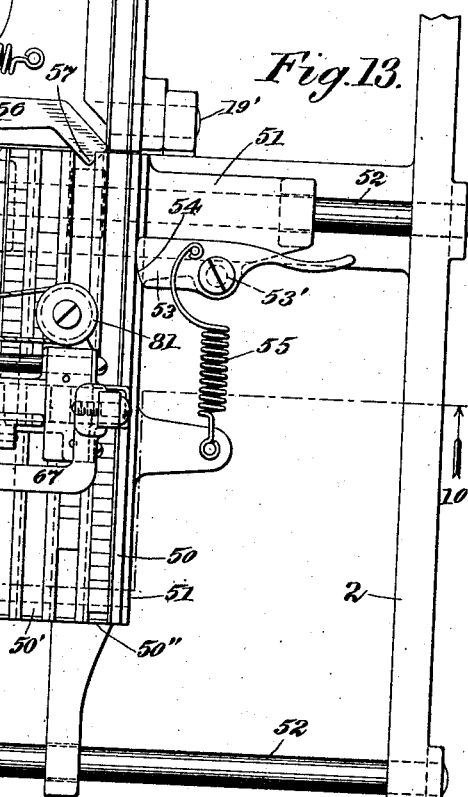

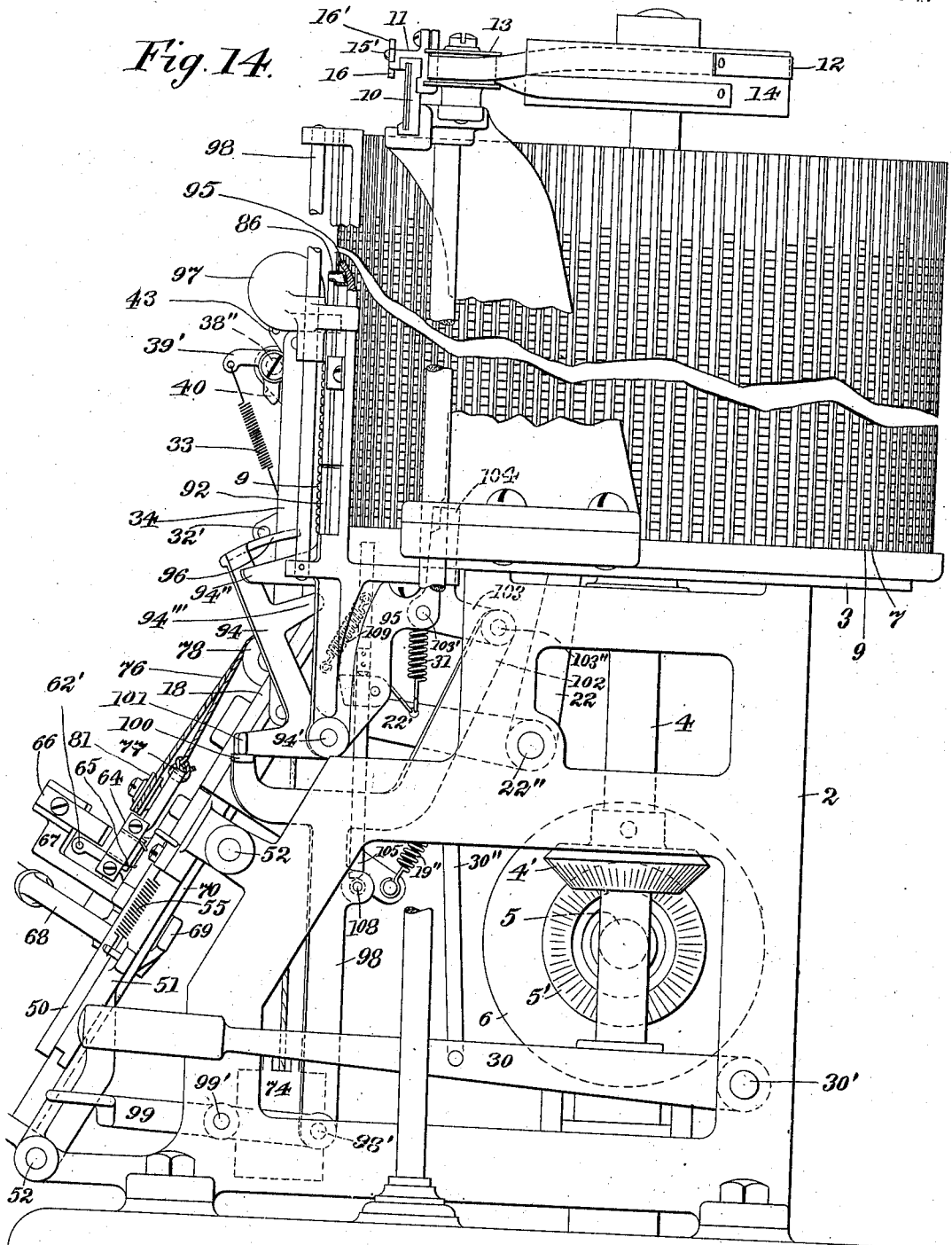

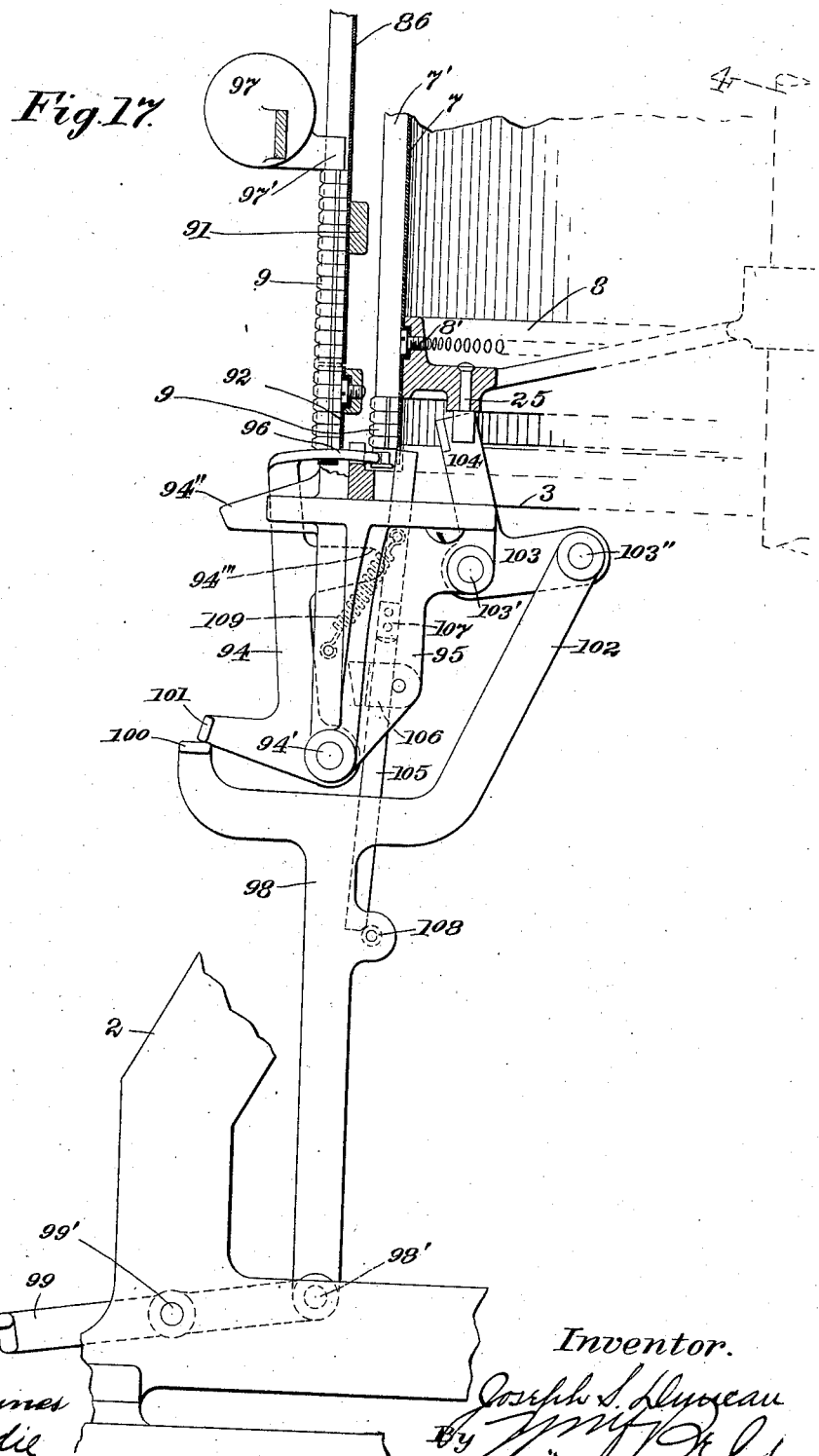

J. S. DUNCAN.
TYPE SETTING AND DISTRIBUTING MACHINE.
APPLICATION FILED OCT. 5, 1908.
963,692.
Patented July 5, 1910.
10 SHEETS—SHEET 10.
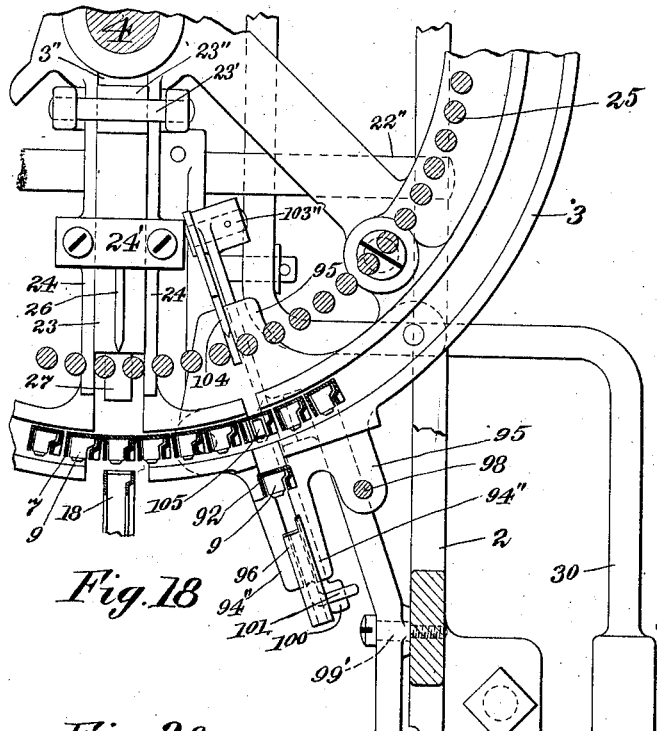
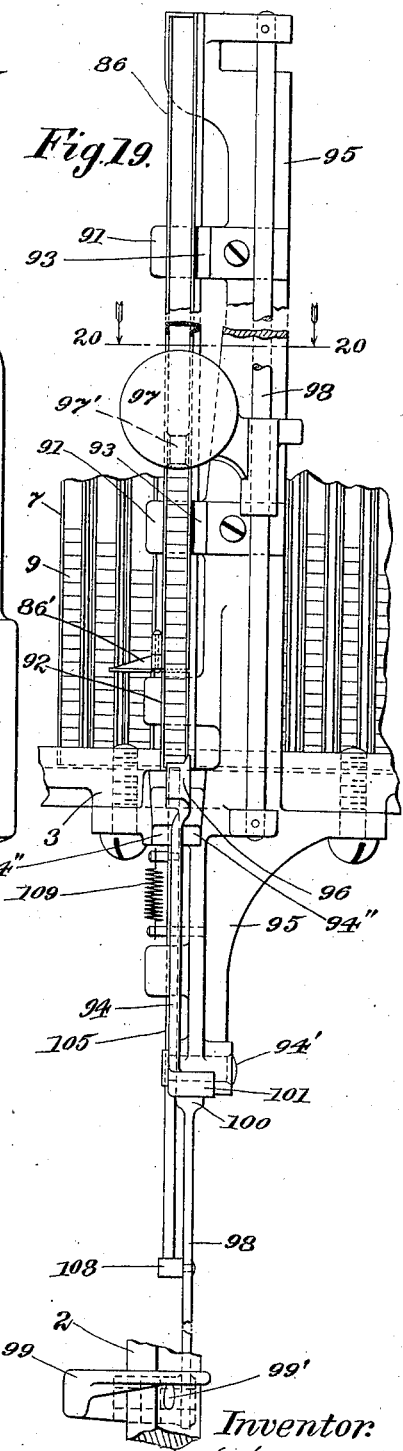
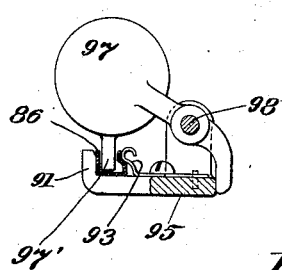
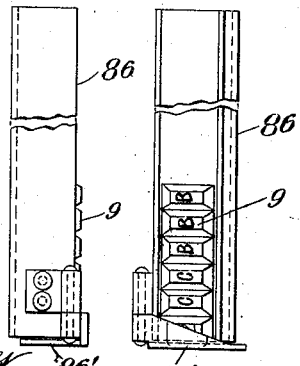
Witnesses:
George Haynes
M. A. Riddle
Inventor:
Joseph S. Duncan
By Wm. Belt
Attorney.

UNITED STATES PATENT OFFICE.

JOSEPH S. DUNCAN, OF CHICAGO, ILLINOIS, ASSIGNOR TO ADDRESSOGRAPH COMPANY, OF CHICAGO, ILLINOIS, A CORPORATION OF ILLINOIS.

TYPE SETTING AND DISTRIBUTING MACHINE.

963,692.                 Specification of Letters Patent.       Patented July 5, 1910.

Application filed October 5, 1908. Serial No. 456,115.

*To all whom it may concern:*

Be it known that I, JOSEPH S. DUNCAN, a citizen of the United States, residing at Chicago, in the county of Cook and State of Illinois, have invented new and useful Improvements in Type Setting and Distributing Machines, of which the following is a specification.

The object of this invention is to provide a machine of simple character which can be easily and quickly operated for taking types from a mazagine and setting them in a suitable holder and also for distributing the type back into the magazine.

In the accompanying drawings illustrating one embodiment of the invention Figure 1 is a front elevation of the machine. Fig. 2 is a side elevation without the distributing mechanism. Fig. 3 is a top plan view of the machine as shown in Fig. 2. Fig. 4 is an enlarged sectional view showing the setting mechanism. Fig. 5 is a detail view of the type channel. Fig. 6 is a view substantially similar to Fig. 4 but showing the parts in a different position. Figs. 7, 8 and 9 are detail views of parts of the feeding device. Fig. 10 is a sectional view on the line 10—10 of Fig. 13 and showing the slug setting mechanism. Fig. 11 is a detail sectional view on the line 11—11 of Fig. 10. Fig. 12 is a detail sectional view on the line 12—12 of Figs. 10 and 13. Fig. 13 is a top plan view showing the slug setting mechanism. Fig. 14 is a side elevation of the machine and showing the distributing mechanism. Figs. 15 and 16 are, respectively, a front elevation and a side elevation of the lower part of the machine and showing the transfer device. Fig. 17 is an enlarged detail view, partly in section, showing the distributing mechanism. Fig. 18 is a top plan view, partly in section, and Fig. 19 is a front elevation showing the distributing mechanism. Fig. 20 is a detail sectional view on the line 20—20 of Fig. 19. Fig. 21 illustrates the transfer type holder.

Referring to the drawings, the invention comprises a base 1 on which is mounted a main frame 2 of suitable construction and comprising a bed plate 3. A vertical shaft 4 and a horizontal operating shaft 5 are suitably journaled in the main frame and they carry intermeshing bevel gears 4' and 5' (Fig. 2). The horizontal shaft 5 is provided with a hand wheel 6 whereby it can be readily operated to turn the shaft 4.

The type magazine is cylindrical in form and is mounted on the vertical shaft 4 to turn therewith. It comprises a plurality of type holders 7 rigidly secured in upright position to the periphery of one or more spider rings 8 keyed to the vertical shaft (Fig. 4). These magazine type holders may be made separate from each other and independently secured to the spider ring by screws 8' or they may all be connected together in the form of a drum provided with channels 7' for the type 9.

An indicator bar 10 (Figs. 1, 2) is supported on the frame transversely of the machine, preferably at the top of the magazine, and the characters corresponding to the type in the magazine are printed or otherwise applied to this bar in accordance with the manner in which the type are arranged in the magazine. A slide 11 is arranged to travel on the bar 10 and it is attached to a ribbon 12 which travels over pulleys 13 mounted on the main frame at the ends of the indicator bar and is crossed in front of and travels also on a wheel 14 to which its ends are secured and which is rigidly mounted on the vertical shaft 4 (Fig. 2). The slide carries an indicator 15 (Fig. 1) which comprises a plate pivoted at 15' to the slide. This plate has two pointed projections 16, 16' and when it is arranged in the position shown in Fig. 1 resting on the stop 17 the projection 16 will be directed downward into position to operate as an indicator for setting the type. When the machine is to be used for distributing type the indicator will be thrown over on its pivot to rest on the stop 17' and then the projection 16' will be directed downward to operate as the indicator and it may be mentioned here that this change of the indicator is necessary because of the fact that the distributing mechanism is located alongside of the setting mechanism and hence the indicator must be adjusted to the work to be done.

A channel or chute 18, preferably in the form of a magazine type holder, is supported on a frame 19 which is pivotally mounted at 19' on the main frame and is held normally in the position shown in Fig. 4 by the spring 19''. Each of the holders 7 is provided at its lower end with inturned projections 20 (Fig. 5) to support the stack of types in the holder and form an end wall therefor. These projections are arranged to leave an opening 20' therebetween for a purpose hereafter described. At the upper end of the chute 18 there is a gripper 21 which is shaped substantially to fit over the face of any type and is normally located in front of the magazine and above its lower edge to engage and lock the second type from the bottom in a magazine holder. Below the gripper there is an opening 21' at the back of the channel which registers with the lowest type in any one of the holders.

A bell crank lever comprising the upwardly projecting arm 22 and the forwardly projecting arm 22', is pivotally mounted at 22" on the main frame (Figs. 4, 6). The lever arm 22 projects upward through an opening 3' in the bed plate 3 and is pivotally engaged with a combined locking and ejector slide 23 at 23'. This slide travels on the bed plate 3 between guides 24 and beneath the cross bar 24' (Figs. 4, 18). The spider ring 8 is provided with a plurality of pins 25 securely fastened thereto and arranged within the magazine in radial relation to the type holders 7. The slide 23 carries a locking projection 26 which is arranged to enter between two pins 25 to lock the magazine with the two lower types in one holder registered with the gripper 21 and the opening 21'. The slide also carries an ejector 27 which is adapted, on the forward movement of the slide, to enter the opening 7''' in the back of the holder and push the lowermost type through the opening 21' into the chute while the type above the one thus being discharged from the magazine into the chute is engaged and held by the gripper 21 (Fig. 6). This movement of the gripper into engagement with the second type from the bottom in the holder is accomplished by swinging the chute frame 19 on its pivot from the position shown in Fig. 4 to that shown in Fig. 6.

A block 28 having a cam projection 28' is supported on a lug 28" projecting rearwardly from the chute frame 19 and this block is engaged by a roller 29 supported on a projection 29' on the lever arm 22'. The bell crank lever is operated by a setter lever 30 which is mounted at one end on a rock shaft 30' supported in the main frame and is connected by a link 30" to the lever arm 22'. (Figs. 1, 4.) Thus it will be readily observed by reference to Figs. 4 and 6 that after the magazine has been adjusted by turning hand wheel 6 to bring the type desired to be set into register with the opening 21' and the setter lever is depressed, the lever arm 22 will swing forward to carry the locking projection 26 into operative position and to operate the ejector 27, but the ejector has a limited travel before it engages the type and during this time the lever arm 22' swings downward and the roller 29 travels onto the cam projection 28' so that the chute frame is swung rearward on its pivot and the gripper is engaged with the second type. When the pressure on the setter lever 30 is released the spring 19" returns the chute frame to its normal position (Fig. 4) and a spring 31 attached to the bed plate and the lever arm 22' returns the bell crank lever and the parts connected therewith to normal position. The spring 19" constantly tends to swing the chute frame 19 outward but this outward movement is limited by the engagement of the cam block 28 with the roller 29. The inward or rearward movement of the slide 23 may be limited by the engagement of the locking projection 26 with the cross bar 24' and by the engagement of the rear end of the slide with a lug 3" on the bed plate 3, and the outward or forward movement of the slide may be limited by engagement of the lug 23" thereon with the cross bar 24' (Figs. 4, 6).

A pusher 32 is pivotally supported at 32' on the chute frame 19 and it projects into the channel of the chute. A spring 33 holds the pusher normally up against a stop 33' on the chute frame (Fig. 4). A bar 34 is pivotally connected at 34' to the lever arm 22' and it carries a pin 34" which engages the pusher on the downward movement of the lever arm 22' and causes said pusher to push the type which has been ejected from the magazine into the chute down below the opening 21'. This bar 34 is held by a spring 35 attached to the lever arm 22' against the projection 36 on the upward extension 37 of the chute frame (Figs. 1, 4, 6). When the setter arm 30 and the lever arm 22 return to normal position the bar 34 will rise to carry the pin 34" away from the pusher and the spring 33 will swing the pusher up to the position shown in Fig. 4, thereby leaving the opening and the type channel in front of said opening clear to receive another type.

If rubber type are used it is desirable to employ means for feeding the stack of type in the holder down to the bottom thereof so that the lowest type in the stack will always be located in position to be discharged from the holder. The weight of metal type will ordinarily be sufficient to feed the stack downward, and this may be true, largely, in connection with rubber type but I prefer to use the feeding mechanism with rubber type and I may also use it with metal type.

The feeding mechanism is illustrated in Fig. 4 and Figs. 6-9, and it comprises a lever 38 (Fig. 8) which is pivoted at 38' on a stud 38" mounted in the extension 37 of the chute frame 19 (Fig. 1). This lever has two arms 39, 39' and a stop 40 just below its pivot. The spring 33 is attached to the outer end of arm 39' and a block 41 (Fig. 9) is pivoted at 41' on a shaft 41" (Fig. 1) which is mounted on the arm 39 (Fig. 6). This block 41 is provided with a lug 42, an arm 43 and a stop lug 44. A feeder arm 45 (Fig. 7) is pivoted at 45' on the shaft 41" and it is provided with one or more projections 46 which are located above the chute 18 in position to engage the stack of type in the magazine holder. A spring 47 is connected to the arm 43 and to the upper end 45" of the feeder arm 45. The lug 42 is made substantially triangular in shape and the bar 34 is provided with a lug 48 of similar shape and these two lugs 42 and 48 are arranged with a flat surface on each in parallel relation. The spring 33 normally holds a cam surface 49 on the feeder arm in engagement with a stop 49' on the upward extension 37 of the chute frame and the spring 47 normally holds the lug 44 on the block 41 in engagement with the feeder arm (Fig. 4). The bar 34 is normally held by spring 31 with the lug 48 above the lug 42 on the block 41 (Fig. 4) and when the lever 22' pulls the bar 34 down the lug 48 will engage the lug 42 thereby causing the block 41 to yield by swinging to the right (Fig. 4). As the bar 34 by engagement of its lug 48 with the lug 42 causes the block 41 to swing to the right the spring 47 yieldingly pulls on the feeder arm 45 to swing the projections 46 into engagement with the type. At the same time the feeder arm is carried downward, its cam 49 riding on the stop 49', to permit of the inward and downward movement of the projections 46 as the lug 42 is forced to one side clear of the lug 48. The projections 46 are arranged to enter between adjacent type as they are swung into engagement therewith and the downward movement of the feeder arm is sufficient to feed the stack of type downward so that the lowest type in the stack will be located opposite the opening 21'. During the movement just described the lever 38 will be swung on its pivot because the block 41 and lever arm 45 are pulled downward at the same time they are swung to the right (Fig. 4), and the spring 33 is stretched. When the lug 48 clears and passes lug 42 the bar 34 continues its downward movement while the spring 33 and the spring 47 return the lever 38, block 41 and feeder arm 45 to their normal position. The stop 40 is arranged to engage the extension 37 to limit the swinging movement of lever 38 under the tension of spring 33. The stop 44 on block 41 engages the lever arm 45 to limit the swinging movement of said block under the tension of spring 47. As the bar 34 continues its downward movement the pin 34" operates the pusher (Fig. 6) in the manner before described and on the return movement of the bar 34 the lug 48 pushes by the lug 42 to normal position (Fig. 4).

As my invention is particularly useful for setting up addresses in a suitable holder to constitute the printing device I have shown an address holder 50 in the drawings (Figs. 1, 10, 13). It will be readily understood that my invention is not confined simply for use in setting up and distributing addresses and I shall use the term "address holder" herein for convenience to include any suitable holder for receiving type in my machine. The address holder is supported on a frame 51 which is slidably mounted on the rods 52 secured in horizontal parallel position on the main frame. The address holder is arranged on the frame 51 against lugs 51' thereon and it is securely held in position by a locking lever 53 which is pivoted at 53' on the frame 51. This lever has a cam face 54 to engage the address holder and clamp it against the lugs 51' to lock it securely on the frame. A spring 55 will hold the locking lever out of operative position when it is released from engagement with the address holder. The address holder is provided with a plurality of type grooves 50' to receive the type and the holder is arranged on its frame directly below the chute 18 so that the type which have been set in the chute may be raked by any suitable device into a groove of the address holder. The frame 51 can be adjusted manually on the rods 52 to bring any one of the type grooves in the address holder into alinement with the chute 18.

I also provide a device for locking the address holder and its frame in proper position to receive a line of type from the chute 18. This device comprises a lever 56 pivoted at 56' on the main frame and provided with a toe 57 which is arranged to engage the open end of the groove in the address holder next adjacent to the groove which is to receive the line of type from the chute 18 (Figs. 1, 13). If the type is to be raked into the first groove in the address holder the toe will be engaged with the side of the holder and rest upon the upper lug 51'. A spring 58 is connected to the main frame and to a projection 58' on the lever 56 to hold the toe 57 in locking engagement with the address holder.

The magazine holders may be made so that the type will fit and move more or less freely therein, and the chute is preferably made so that the type will move therein but only under pressure. The grooves in the address holder are preferably made to hold the type like the chute and in order to keep the form in proper position it is desirable to locate a slug or quad at each end of each line of type or in any event at the open end of each type groove. In order that these slugs may remain fixed in the position in which they are set I prefer to make them somewhat wider than the grooves of the address holder, and this necessitates the provision of a slug setting mechanism as a part of the machine. This mechanism is illustrated in Figs. 10–13 and elsewhere in the drawings and it comprises a frame 59 which is arranged to slide up and down on an inclined rod 60 secured in the main frame. The slugs 61 are arranged in a line on the table 59' of the frame, which is supported in an inclined position (Fig. 2) and a cover 62 is pivoted at 62' on the slug frame 59 and arranged to cover the line of slugs on the table (Fig. 12). At the discharge end of the slug table 59'', which in effect constitutes a slug channel, there is a pocket 63 formed by a bent strip 64 fastened to the slug frame (Fig. 11), and in this pocket there are secured two spring metal fingers 65 to prevent the premature discharge of a slug. The slug driver 66 (Fig. 10) is carried by a driver lever 67 which is pivoted at 67' on the frame 59 and a handle lever 68 is pivoted at 68' on the driver lever between its pivot 67' and the driver. The handle lever is provided, below its pivot 68', with a toe 69 which is arranged to engage the underside of a rod 70 which is secured in the main frame.

The slug frame is adapted to oscillate on a rod 60 and its discharge end is returned to normal elevated position (Fig. 10) by a spring 71 which is fastened to the underside of the slug frame, at the discharge end of the table, and engages the rod 70. A threaded stud 72 on the slug frame extends downward through a lug 67'' on the driver lever and a spring 73 is arranged on said stud between said lug and the nut 72'. This spring returns the driver lever and handle lever to normal position after they have been operated. The slug frame is counter-balanced by a weight 74 and this same weight is utilized for feeding the slugs along to discharge position on the table. The weight is carried by a rope 76 which is fastened at one end to the slug frame at 77 and passes over a pulley 78 supported on the main frame, thence around a pulley 74' on the weight, thence over a pulley 79 mounted alongside of the pulley 78, then around pulley 80 on the slug frame at or about its middle, then around pulley 81 mounted at the discharge end of the slug frame, and its other end is attached at 82 to a collar 83 which travels on the rod 84 supported on the slug frame (Fig. 13). This collar operates a feeder 85 which travels on the table 59' and pushes the slugs along to discharge position.

The pocket 63 is located in alinement with that groove of the address holder which alines with the chute 18 and the slug setting mechanism may be readily moved to the lower end of the rod 60 while the type are being raked from the chute into the address holder after which the slug setting mechanism is adjusted to register the pocket with the type groove in the address holder at the end of the line of type therein. This adjustment of the type setting mechanism is facilitated by the counter-balancing weight 74 which, as heretofore stated, also serves to operate the slug feeder 85. After the pocket is properly positioned the handle lever 68 is depressed and as its toe 69 is fulcrumed against the rod 70 the driver lever 67 will be swung downward on its pivot to cause the driver 66 to enter the pocket 63 and force the slug through the pocket between the spring fingers 65 and into the groove of the address holder.

I will now proceed to describe the distributing mechanism of my improved machine whereby type from the address holders are distributed back in proper place in the magazine. In the first place it will be understood that the slugs are removed from the address holder by pincers, or other suitable instruments, and the address holder is arranged in reverse position end for end on the frame 51. That is to say, when the address holder is being filled it is arranged as shown in Fig. 13 with the open end of the type channels uppermost and the end provided with the stops 50'' lowermost. For distributing the type the holder is arranged with the open end of the type channels downward (Fig. 15).

From the address holder the type are raked into the channel of a long transfer holder 86 which is secured on a frame 87 against lugs 88 by a locking lever 88' (Figs. 15, 16). This frame is provided with lower socket lugs 87' and an upper socket lug 87'' which engage with the cross rods 52 on the main frame of the machine and whereby the transfer frame may be removably engaged with the main frame. A device for locking the transfer frame in position, with the channel of the transfer holder 86 in alinement with the groove in the address holder, is provided on the transfer frame and it comprises a lever 89 under tension of spring 90 and provided with a toe 89' which engages a channel in the type holder in the manner heretofore described in connection with the device 56 for locking the address holder on its frame. The transfer holder is preferably of such a length that it will receive the contents of at least several grooves of an address holder, and of several holders, if desired, and after the transfer holder has been filled with type from the address holder, or holders, it is removed from its frame and secured in upright position on the brackets 91, attached to the main frame opposite the magazine (Figs. 1, 19) and above the chute 92 fastened to the main frame (Fig. 17). The transfer holder is secured to the brackets 91 by spring clips 93 (Fig. 20).

To prevent the type from slipping out of the transfer holder while the latter is being moved from receiving position (Figs. 15, 16) to distributing position in the brackets 91 (Figs. 17, 19) I provide said holder with a hinged end 86' (Fig. 21) which can be thrown to open position when the type are to be distributed.

The distributing mechanism comprises a lever 94 (Fig. 17) which is pivoted at 94' on a bracket 95 depending from the bed plate 3. This lever operates between guides 94" and carries a finger 96 which is arranged to enter the chute 92 and force a type therefrom into the particular holder of the magazine which has been registered in proper position. In view of the fact that the distributing mechanism is located at one side of the setting mechanism it will be understood, to secure proper registration, the indicator 15 must be thrown over to engage the stop 17'. The type are moved from the transfer holder to fill the chute 92 so that the lowermost type in the chute will be in position to be pushed by the distributing finger 96 into the magazine holder. The type are fed downward in the transfer holder and from said holder into the chute 92 by a weight 97 which slides on a rod 98 supported on the main frame, and this weight has a projection 97' which travels in the channel of the transfer holder and engages the type therein.

The distributing lever 94 is operated by a forked lever 98 which is pivotally connected at 98' with a hand lever 99 pivoted on the main frame at 99'. The lever 98 has a projection 100 which is arranged to engage a projection 101 on the distributing lever, whereby said distributing lever will be swung on its pivot when the hand lever is depressed. The lever 98 also has an arm 102 which operates a device for locking the magazine in position to receive a type after a holder has been properly registered in distributing position. This locking device comprises an angle lever 103 which is pivotally mounted at 103' on the bracket 95 and is pivotally connected at 103" to the arm 102. The upper arm 104 of this angle lever is arranged to enter between any pair of pins 25 on the magazine to lock the magazine in registered position just as it is locked for the setting operation by the locking projection 26.

In order to raise the stack of types in the magazine holder into which the type is to be inserted at the lower end of the holder I provide a rod 105 which is guided in a lug 106 on the bracket 95 and is provided with a stop 107 to engage said lug and limit the downward movement of the rod. This rod is arranged to be engaged at its lower end by a pin 108 on the lever 98 and when this lever is first raised it will push the rod 105 upward through the opening 20' in the lower end of the magazine holder (Fig. 5) to force the stack of types in the magazine holder upward and hold them upward until a type has been forced by the distributing finger 96 into the space thus provided for it at the lower end of the magazine holder. As the type is thus forced into its magazine holder the rod 105 is pushed out of the lower end of the holder by lug 94''' on lever 94 (Fig. 17). The upper end of the rod 105 is normally held in position to enter the lower end of the magazine holder by the spring 109.

My invention provides a simple and compact machine for setting and distributing type in a convenient and expeditious manner and the several operations of setting as well as of distributing are timed and produced in such a simple manner that the machine can be used by persons not especially skilled, for which reason it is adapted for office use by owners and operators of addressing and similar machines.

What I claim and desire to secure by Letters Patent is:

1. The combination of a revolving magazine having a plurality of stacks of type arranged on its periphery, an ejector located within the circle of type carried by said magazine, and means for actuating said ejector to discharge a type radially from the magazine.

2. The combination of a rotatable magazine having a plurality of stacks of type arranged on its periphery, an ejector located wholly within the circle of type carried by said magazine and in the plane of the lowest type in the stacks, and means for actuating said ejector radially of the magazine to discharge a type from the magazine.

3. The combination of a circular rotatable magazine carrying a supply of type on its periphery, an ejector arranged to engage the base only of a type, and means for operating said ejector to push the type radially outward from the magazine.

4. The combination of a magazine carrying a supply of type on its periphery, means for revolving said magazine, a relatively fixed ejector located within the periphery of the magazine and perpendicularly to the surface, and means for operating said ejector to push a type radially out of the magazine.

5. The combination of a magazine carrying a supply of type arranged in upright stacks side by side on its periphery, means for revolving said magazine, a relatively fixed ejector located within the periphery of the magazine, and means for operating said ejector transversely of the magazine to engage the lowest type in a stack and push it from the magazine.

6. The combination of a magazine carrying a supply of type on its periphery, said type being arranged in stacks with the face of each type directed outwardly and its base directed inwardly, means for revolving the magazine, a relatively fixed ejector located within the periphery of the magazine, and means for operating the ejector to engage the base of the type and push it out of the magazine.

7. The combination of a revoluble magazine carrying a supply of type on its periphery, a radially movable ejector located within the periphery of the magazine, and means for operating said ejector to push a type outwardly from the magazine.

8. The combination of a magazine carrying a supply of type longitudinally disposed on its periphery, means for revolving said magazine, a relatively fixed ejector located within the periphery of the magazine, and means for moving said ejector radially within the magazine to push a type outward from the magazine.

9. The combination of a magazine comprising a vertically arranged cylinder having a plurality of type channels located side by side on its periphery to hold a supply of type, each type having its face directed outwardly and its base directed inwardly, means for revolving the magazine, a relatively fixed ejector located within the periphery of the magazine at the bottom thereof, and means for moving the ejector radially within the magazine to engage the base of a type and push it out of the magazine.

10. The combination of a revoluble magazine carrying a supply of type, each type being arranged with its face directed outward and its base directed inward, and said magazine having an opening to permit access to the base of a type, a radially movable ejector located within the magazine, means for revolving said magazine, and means for operating said ejector to engage the base of a type and push it forward out of the magazine.

11. The combination of a magazine comprising a cylinder, a plurality of type holders mounted on the outer surface of the cylinder, each of said holders having an opening at its back and at one end thereof, means for revolving the magazine, means located within the magazine for operating through the opening in any holder to discharge the type in front of said opening, and means for operating said discharging means.

12. The combination of a magazine comprising a vertically-arranged cylinder, a plurality of type holders mounted on the cylinder side by side, each of said holders projecting below the lower end of the cylinder and provided with an opening in its back, means for revolving said magazine, radially movable means located at the lower end of the cylinder and adapted to operate through the opening in any holder to discharge the type in front of said opening, and means for operating said discharging means.

13. The combination of a magazine carrying a supply of type, means for revolving said magazine, means for locking said magazine, means for ejecting a type from the magazine, and means for simultaneously operating said locking and ejecting means.

14. The combination of a magazine carrying a supply of type, means for revolving said magazine, a plurality of concentrically arranged locking pins located within and rigid with the magazine, a sliding device arranged to enter between any pair of pins to lock the magazine, and means for operating said device.

15. The combination of a magazine carrying a supply of type, means for revolving said magazine, a device adapted to engage the magazine to lock the same, an ejector for discharging a type from the magazine, and means for simultaneously operating said locking device and ejector.

16. The combination of a magazine carrying a supply of type, means for revolving said magazine, a plurality of concentrically arranged pins on the magazine, a slide, a device on said slide to engage said pins and lock the magazine, an ejector on said slide for discharging a type from said magazine, and means for operating said slide.

17. The combination of a fixed bed plate, a magazine comprising a cylinder vertically arranged above said bed plate and provided with a plurality of type channels arranged side by side on its outer surface to hold a supply of type, each of said channels having an opening at its back and at its lower end, a plurality of pins concentrically arranged on the magazine within the cylinder, means for revolving the magazine, a slide radially movable on the bed plate, a device carried by said slide to engage said pins and lock the cylinder, an ejector on said slide to operate through the opening in any channel to discharge the type in front of said opening, and means for operating said slide.

18. The combination of a magazine carrying a stack of type, means located exteriorly of the magazine to engage and feed said stack to position the type to be discharged, and means located interiorly of the magazine to engage and push a type forward out of the magazine.

19. The combination of a cylindrical magazine carrying a supply of type arranged in stacks side by side on its periphery, means for revolving said magazine to register a stack in position for the discharge of a type therefrom, means located in front of the magazine to engage and feed the registered stack to position the type to be discharged, and means located within the periphery of said magazine to push the type forward out of the magazine.

20. The combination of a magazine carrying a supply of type arranged in stacks side by side, means for revolving said magazine to register a stack in position for the discharge of a type therefrom, means for engaging and feeding said stack to position the lowest type therein for discharge, and radially movable means located within the magazine to engage the base of said type and push it out of the magazine.

21. The combination of a revoluble magazine carrying a supply of type arranged in stacks side by side on its periphery and longitudinally thereof, a chute supported adjacent to the magazine, means for revolving the magazine to register a stack with said chute, means located within the magazine for discharging the lowest type from the registering stack into the chute, and means for operating said discharging means.

22. The combination of a revoluble magazine carrying a supply of type arranged in stacks side by side on its periphery, a chute supported adjacent to the magazine and provided with an opening, means for revolving the magazine to register a stack with said chute, means for discharging a type from the registered stack through said opening into the chute, and means for operating said discharging means.

23. The combination of a cylindrical magazine carrying a supply of type arranged in stacks side by side, means for revolving said magazine, a chute arranged adjacent to said magazine and provided with an opening therein to register with the lowest type in any stack arranged in discharge position, means located within the magazine for discharging said type through said opening into the chute, and means for operating said discharging means.

24. The combination of a magazine carrying a supply of type arranged in stacks side by side, means for revolving said magazine, a chute arranged adjacent to said magazine and provided with an opening therein to register with the lowest type in any stack arranged in discharge position, means for locking the magazine, means for discharging the lowest type in the stack through said opening into the chute, and means for operating said locking and discharging means.

25. The combination of a magazine carrying a supply of type arranged in stacks side by side, means for revolving said magazine, a chute arranged adjacent to said magazine and provided with an opening therein, means for feeding the type in the stack which has been arranged in discharge position to register the lowest type in said stack with said opening, and means located within the magazine for discharging said type through said opening into the chute.

26. The combination of a magazine carrying a supply of type arranged in stacks side by side, means for revolving the magazine, means for feeding the type in the stack which has been moved to discharge position to position the lowest type therein for discharge, means for locking said magazine, means for discharging said lowest type, and a single lever for operating said feeding, locking and discharging means.

27. The combination of a magazine carrying a supply of type arranged in stacks side by side, a chute arranged adjacent to said magazine, means located within the magazine for pushing the lowest type out of any stack into the chute, and means on the chute for locking the type above said lowest type in the stack during said discharge operation.

28. The combination of a magazine carrying a supply of type arranged in stacks side by side, means for revolving said magazine, radially movable means within the magazine for discharging the lowest type from any stack, a frame pivotally mounted on the machine and provided with a type channel which receives said type at its upper end as it is discharged from the magazine, and a gripper on said frame to engage the type above the type being discharged.

29. The combination of a magazine carrying a supply of type arranged in stacks side by side, means for discharging the lowest type in any stack, a chute to receive said type at its upper end as it is discharged from the magazine, means for feeding said type in the stacks to the type discharging means, a pusher operating in said chute for moving the type in the chute away from the receiving end thereof, and means for actuating said pusher and said type feeding means.

30. The combination of a magazine carrying a supply of type arranged in stacks side by side, means for pushing the lowest type in any stack forward out of the magazine, a chute to receive the type as they are discharged from the magazine and provided with an opening therein through which said type enter the chute, a gripper on said chute to engage the type above the one being discharged, and a pusher operating to push the type in the chute away from said opening.

31. The combination of a magazine carrying a supply of type arranged in stacks side by side, means for pushing the lowest type in any stack forward out of the magazine, a frame mounted to oscillate on the machine, a chute on said frame in front of the magazine and provided with an opening through which the type are discharged from the magazine into said chute, a gripper on the chute to engage the type above the one being discharged, and means for swinging said frame to operate said gripper and discharging means.

32. The combination of a magazine carrying a supply of type arranged in stacks side by side, means for revolving said magazine, means for locking the magazine, means for feeding the type in the stack which has been arranged in discharge position to register the lowest type therein for discharge, means for gripping the type above the one to be discharged, means for discharging said lowest type, and a single lever for operating said locking, feeding, gripping and discharging means.

33. The combination of a magazine carrying a supply of type arranged in stacks side by side, means located within the magazine for discharging the lowest type in any stack, a feeding device located in front of the stack in discharge position, and means for imparting to said device an inward movement to engage between a pair of type in the stack and then a downward movement to feed the type downward and insure the positioning of the lowest type in the stack for discharge.

34. The combination of a magazine carrying a supply of type arranged perpendicularly in stacks side by side, means for discharging horizontally the lowest type in any stack, a yieldingly supported feeder arm located between the ends of the stacks, means carried by said arm for engaging and feeding the type in the stack, and means for operating said arm.

35. The combination of a magazine carrying a supply of type arranged in stacks side by side, a two arm lever pivoted between its ends on the frame of the machine, a feeder arm mounted on said lever pivot, a block pivotally mounted on said lever, a spring connecting the block and the feeder arm, a device on said feeder arm for engaging the type in the stack to feed the same downward, a lug on the block, a vertically movable bar, a lug on said bar to engage the lug on the block, and means for operating the bar.

36. The combination of a magazine carrying a supply of type arranged in stacks side by side, a chute, means for discharging a type from any one of the stacks into the chute, a pusher arranged to feed the type in the chute away from the receiving end, a vertically movable bar, and means on said bar to engage and operate said pusher.

37. The combination of a magazine carrying a supply of type arranged in stacks side by side, a chute, means for discharging a type from any one of the stacks into the chute, a pusher pivotally mounted at one end in front of the chute and having its other end arranged to swing in the chute to engage and feed the type in the chute away from the receiving end thereof, means for operating the pusher, means for feeding said type in the stacks, and means for simultaneously operating said feeding means and said pusher.

38. The combination of a revoluble magazine carrying a supply of type arranged in stacks side by side, a chute having its receiving end located in front of the magazine and provided with an opening at one side of the top, means for discharging a type from any one of the stacks forward through said opening into the chute, and a pusher pivotally mounted at one end in front of the chute and having its other end arranged to work in the chute across the said opening.

39. The combination of a magazine carrying a supply of type arranged in stacks side by side, a chute having its receiving end located in front of the magazine and provided with an opening at one side of the top, means for discharging a type from any one of the stacks through said opening into the chute, a pusher pivotally mounted at one end in front of the chute and having its other end arranged to swing in the chute across said opening, a feeding device located above the pusher and chute, and means for imparting to said feeding device an inward movement to engage between a pair of type in a stack and then a downward movement to feed the type downward.

40. The combination of a magazine carrying a supply of type, a chute, means for discharging type from the magazine into the chute, a holder provided with a plurality of type grooves adapted to be arranged in alinement with the chute, a spring pressed locking lever, and a toe on said lever to engage the open end of a groove in the holder to lock the holder.

41. In a machine of the character described, slug setting means comprising a movable frame, a table on the frame adapted to receive a supply of slugs, a pocket at one end of the table, means for feeding the slugs to said pocket, and a single means for operating said feeding means and counterbalancing the slug frame.

42. In a machine of the character described, slug feeding means comprising a table adapted to receive a supply of slugs, a pocket at one end of the table, means for feeding the slugs to said pocket, and yielding means to prevent accidental escape of the slug therefrom, but permitting the slug to be discharged without being compressed.

43. In a machine of the character described, slug setting means comprising a movable frame, a table on the frame to receive a supply of slugs, a cover pivotally mounted on the frame to cover the line of slugs on the table, a rod on the slug frame adjacent to the table, a collar on the rod, a feeder on the collar arranged to engage the line of slugs on the table, and means for moving said collar and feeder.

44. In a machine of the character described, slug setting means comprising a frame, a table on the frame to receive a supply of slugs, a pocket at one end of the table, means for feeding the slugs to said pocket, a driver operating in said pocket, a lever pivoted on the frame and carrying said driver, a handle lever pivoted on said driver lever between its ends, a fixed part on the machine, and a toe on said handle lever to engage said fixed part.

45. In a machine of the character described, the combination of an indicator bar, a movable slide, an indicator plate mounted on said slide, and means for adjusting said plate for the setting or distributing operations.

46. In a machine of the character described, the combination of an indicator bar, a slide arranged to travel on said bar, and an indicator plate pivotally mounted on said slide and adapted to indicate for the setting operation when swung to one side of its pivot and for the distributing operation when swung to the other side of its pivot.

47. In a machine of the character described, the combination of an indicator bar, a slide arranged to travel on said bar, an indicator plate pivoted on said slide, a projection on one side of said indicator plate to point to the indicator bar when the plate is swung in one direction, and a projection on the other side of the indicator plate to point to the indicator bar when the plate is swung in the opposite direction.

48. In a machine of the character described, the combination of a main frame, a type holder detachably secured on said main frame, said holder having a plurality of grooves containing type, a transfer frame mounted on the main frame, and a transfer holder detachably secured on the transfer frame below the type holder and in alinement with a type groove in the holder and adjacent to the end thereof.

49. In a machine of the character described, the combination of a main frame, a type holder detachably mounted on the main frame, a transfer frame detachably mounted on the main frame, and a transfer holder detachably mounted on the transfer frame in alinement with a groove in the type holder.

50. In a machine of the character described, the combination of a main frame, means for detachably securing a type holder thereon, a transfer frame, means for detachably securing a transfer holder on the transfer frame to receive type from the type holder, a magazine for holding a supply of type, means for securing said transfer holder in position adjacent to said magazine, and means for distributing the type from the transfer holder to the magazine.

51. In a machine of the character described, the combination of a vertically arranged cylindrical magazine having a plurality of upright type holders arranged side by side on its periphery, means for revolving said magazine, a chute supported in front of the magazine, a transfer holder, means for supporting the transfer holder containing a plurality of type above said chute, said chute having an opening in its bottom at its lower end, means for moving the type from the transfer holder to the chute, and means for distributing the type from the chute through said opening in the bottom thereof to the magazine.

52. In a machine of the character described, the combination of a revoluble magazine having a plurality of type channels on its periphery, a chute supported in front of the magazine and provided with an opening in its bottom, means for supplying the chute with type, means for registering the magazine with a channel opposite the chute, means for lifting the type in the registered channel to leave a space to receive another type, and means operating through said chute to push a type through said opening into said space.

53. The combination of a magazine provided with a plurality of type channels, a type holder mounted on the machine radially to said magazine, means for revolving the magazine, means for locking the magazine, and means for distributing type singly from the holder into a channel on the magazine.

54. The combination of a magazine provided with a plurality of type channels, a type holder mounted on the machine adjacent to said magazine, means for revolving the magazine, means for locking the magazine, means for distributing type from the holder into a channel at the bottom thereof, and a single lever for operating said distributing and locking means.

55. The combination of a magazine carrying a supply of type arranged in stacks side by side, a vertically movable rod normally disposed beneath said stacks, means for actuating said rod to lift said stack so that a type may be inserted thereunder, and means for imparting a lateral movement to said rod to disengage it from the stack.

JOSEPH S. DUNCAN.

Witnesses:
  Wm. O. Belt,
  M. A. Kiddie.